Oct. 14, 1969          H. G. ROGERS          3,473,013
POLARIZED LIGHT PROJECTING ASSEMBLY
Filed Oct. 2, 1967

INVENTOR.
Howard G. Rogers
BY Brown and Mikulka
Leonard S. Selman
ATTORNEYS

United States Patent Office 3,473,013
Patented Oct. 14, 1969

3,473,013
POLARIZED LIGHT PROJECTING ASSEMBLY
Howard G. Rogers, Weston, Mass., assignor to Polaroid Corporation, Cambridge, Mass., a corporation of Delaware
Filed Oct. 2, 1967, Ser. No. 672,320
Int. Cl. F21v 9/14, 13/04
U.S. Cl. 240—9.5     12 Claims

ABSTRACT OF THE DISCLOSURE

A device for projecting polarized light. A combination of spherical and elliptical reflectors is used to reflect light to a first focus of the elliptical reflector. The light not incident upon a reflector is projected to the first focus by a lens. Adjacent the first focus, a total polarizer is positioned to polarize substantially all the light emitted, by a light source, placed at the second focus.

Background and summary of the invention

The light projecting assembly as described herein utilizes a total polarizer of the type shown in U.S. Patent No. 3,213,753, assigned to the same assignee, which is placed over the light projection opening. The term "total polarizer" as used herein refers to a particular kind of efficient polarizer, usually multilayered, which selectively polarizes most of the randomly polarized light incident thereon in contrast to dichroic polarizes by which a much larger proportion of the incident light is not so polarized. Total polarizers divide incident light into two different components spatially separated from each other and of opposite polarization characteristics. One or both of the components may be acted upon by rotator elements to bring the polarization azimuths of the two components into parallelism thereby producing uniformly polarized light.

Total polarizers of this type can be designed quite efficiently to operate on light coming from or directed toward a single light source located either at close distances or at infinity. Light incident from more than one source, however, is not uniformly dealt with by such polarizing filters. This light projection assembly of the present invention is designed to collect almost all of the light output from a lamp and direct it so that almost all the rays pass through or are directed toward substantially a single focus with a direction or propagation toward a total polarizer designed to deal efficiently with light originating at such a focus.

The light projection assembly in general may comprise a light source mounted within a substantially ellipsoidal, open-mouthed light reflector having a proximate focus and a remote focus. The light source is mounted at the proximate focus such that the reflector forms a light source image at the remote focus. Those direct rays from the light source which do not strike the reflector are also directed toward the remote focus by a light refracting means such as a simple lens system positioned to focus the direct rays intercepted thereby at the remote focus. A light transmitting total polarizer is positioned to intercept direct and reflected light rays at the remote focus and to polarize the rays and transmit them efficiently as a beam of polarized light. The uses contemplated for the assembly include anti-glare headlight systems for vehicles, as well as monoscopic and stereoscopic projection systems, and the like.

Accordingly, an object of this invention is to provide a novel polarizing light projection assembly which projects almost all the light output from a source toward a single point. Another object of this invention is to provide a novel light projection assembly which projects almost all the light output from a source toward a single point and polarizes said light with a high degree of efficiency transmitting it as a beam of highly polarized light.

Other objects of the invention will in part be obvious and will in part appear hereinafter.

The invention accordingly comprises the apparatus possessing the construction, combination of elements, and arrangement of parts which are exemplified in the following detailed disclosure of a preferred embodiment taken in connection with the accompanying drawing.

Description of the preferred and modified embodiments

The present invention is primarily concerned with the end problem of providing a highly efficient polarized light source, namely, one which is particularly adapted to produce a beam of polarized light using practically all of the output of a point source of unpolarized light, for use in equipment such as may be employed for signaling, projection and display purposes, or the like, and in an anti-glare system for automotive vehicles. The point source light beams may be provided by a suitable combination of reflector and refractor elements and polarized by transmission through a selected combination of structural materials having the same general design but whose detailed parameters are adapted to their relative position with that of the source. The beams are converted to polarized rays of substantially undiminished intensity. The transmitted polarized light may be in the form of either collimated or non-collimated rays as desired, depending upon the structural characteristics provided in the sheet material. Again, the transmitted rays may either be plane polarized and vibrating in a single given azimuth, or vibrating in predeterminedly different directions. Alternatively, they may be circularly polarized. With these general considerations in mind, a specific structure useful in the practice of the invention will now be described in detail.

Figure 1:
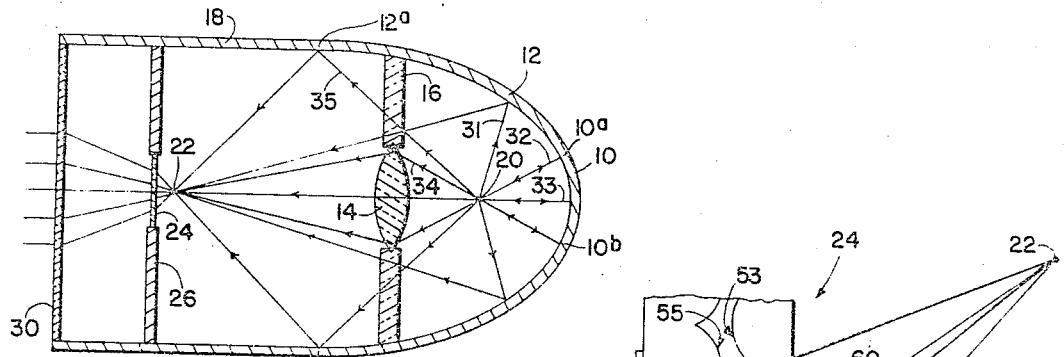
FIG. 1 is a diagrammatic representation of a light projecting assembly constructed in accordance with the invention.

Referring now to FIGURE 1, there is shown an optical system particularly adapted for producing in combination with the polarizing structure to be described, a beam of polarized light using substantially all of the output of a light producing filament radiating in all directions. The system, composed of reflector and refractor elements, and the light polarizing material is shown in cross-section and consists of spherical surface of revolution 10 bounded by points 10a and 10b, elliptical surface of revolution 12 bounded by points 10a, 10b, 12a and 12b and convex lens 14 supported by transparent ring 16. Cylinder 18 extends beyond surface 12 and supports polarizing and focusing elements. Filament 20 is powered by an electrical source not shown.

The optical combination shown in the figure produces a point source of unpolarized light at point 22 radiating in a cone subtended by total polarizer 24. Total polarizer 24 is supported by ring 26 attached to cylinder 18 which is a continuation of surfaces 12 and 10. Thus, the shell composed of surfaces 18, 12 and 10 is unitary in structure. The exit aperture of the shell is overlaid with focusing element 30, for example, a collimating element, which serves to direct the polarized radiation produced by polarizer 24 in conjunction with the reflector-refractor system.

Filament 20 located at the center of spherical segment 10 and at the proximate focus of elliptical segment 12 radiates in all directions, and produces, by way of illustration, rays 31, 32, 33, 34 and 35. Ray 31 strikes elliptical surface 12 and is reflected toward point 22, the remote focus of elliptical segment 12, ray 31 just missing the edge of lens 14 and passing through transparent support ring 16. Ray 35 describes an equivalent optical path and is focused at point 22 but passes the edge of lens 14 prior to reflection rather than after. As may be seen, the point of incidence of ray 35 on surface 12 describes the further limit of the elliptical surface.

Ray 32 is reflected from spherical surface 10 directly back through source 20 such that it just intercepts the outer edge of lens 14. Lens 14 focuses that ray at point 22 as well as ray 34 emanating forward from filament 20. Axial ray 33 is reflected from surface 10 and passes straight through to point 22 unrefracted. The point of incidence of ray 32 describes the furthest limit of spherical segment 10 which is also the interception point 12b of elliptical surface 12. Thus the boundary point of lens 14 determines the boundary points of the various reflective surfaces of revolution; conversely the limits of the surfaces also dictate the boundary points of the lens. Thus, it is clear that a great many different combinations having a multiplicity of optical parameters may be used to produce point source 22. It will be noticed that substantially all of the radiation is focused by this combination at point 22, a highly desirable effect which allows the use of low power filaments, thus reducing power consumption and the extraneous heating effects associated with high wattage filaments.

Figure 2:
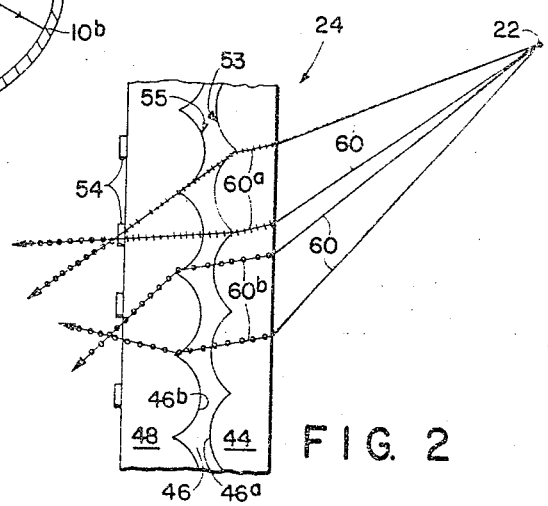
FIG. 2 is a diagrammatic edge view of the light polarizing means of the present invention illustrating the transmission of light rays therethrough.

In FIG. 2 there is shown, in considerably exaggerated dimensions, a total polarizer 24 positioned as shown in FIG. 1 to intercept the light focused at point 22. The polarizer 24 is shown as it would appear in elevation, namely, as viewed along a given edge. In order of arrangement with respect to the direction of the beam of light directed through point 22, the total polarizer is composed of a birefringent layer 44, an isotropic layer 46 and a birefringent layer 48, the layers preferably being laminated or bonded together to form a unitary structure. Half wave retardation strips 54 are positioned on the exit surface of layer 48. It is not essential to operability to have the layers bonded together provided, however, that the adjacent layer surfaces enclosing an air layer are maintained parallel to one another. Each birefringent layer 44 and 48 has a higher and a lower refractive index. The isotropic layer 46 is of a material chosen to have an index of refraction closely matching one of the indices of the birefringent layers, preferably the lower one. For purposes of illustration, the aforesaid refractive indices may be taken as follows: the refractive index of layer 46 is 1.55; the two indices of layers 44 and 48 are 1.55 and 1.70. Birefringent layers 44 and 48 each are subjected to a stretching operation to form therein a pair of orthogonally disposed optic axes 50 and 51, respectively.

The interface 53 between layers 44 and 46 is composed of a plurality of lens-like or lenticular elements 46a and the interface 55 between layers 46 and 48 is composed of a plurality of lens-like or lenticular elements 46b. It will be noted that the lenticules of one interface are offset, laterally, with respect to those of the other. The term "lenticular," as employed herein, may broadly be interpreted as constituting a plurality of surface configurations as well as those of a strictly lens-like form. A certain degree of latitude is possible as to the choice of materials employed in forming the several layers. Thus, for example, layer 46 may suitably be composed of an isotropic plastic material, as for example, a methacrylate, such as cyclohexymethacrylate. Layers 44 and 48 may, appropriately, be composed of a plastic material as, for instance, polyethylene terephthalate which has been rendered birefringent. A readily obtainable material of this composition, having refractive indices of 1.55 and 1.70 when thus rendered birefringent is one having the trade name "Mylar," sold by E. I. du Pont de Nemours and Co., Wilmington, Del., U.S.A.

Consistent with obtaining an operational refraction or non-refraction of rays generally similar to that shown in FIG. 2, and which is described below, the several layers may be formed of substantially any materials having suitable refractive indices, transparency and physical or mechanical properties such as thermal stability, flexibility or adhesion. Thus, for example, layer 46 may be composed of any of such materials as vinyl acetate, cellulose acetate butyrate, and acrylic, glass, etc. Layers 44 and 48 may be a sodium nitrate crystal plate having indices of refraction of 1.587 and 1.336 or a calcite crystal plate having indices of 1.658 and 1.486.

It is possible to use an isotropic interlayer, the index of refraction of which does not necessarily match the lower index of the birefringent sheets. There can, in fact, be used a material whose refractive index lies below the lower index of the birefringent layer with satisfactory results.

Additional materials which can conceivably be used in forming layers 44 and 48 comprise cellulose acetate, ethyl cellulose, methyl cellulose, natural crystals of urea or some other minute birefringent particles. While a uniaxial type of birefringent layer is that principally conceived of and preferred, it is possible to employ a biaxial material for the purpose provided that the proper functional relation between the indices of refraction of the several layers is maintained. The indices of refraction of the several layers may further be controlled by predeterminedly altering their moisture or plasticized content, as for example, the index may be lowered by adding moisture content and, in general, by adding plasticizers. Where bonding substances or subcoats are employed in laminating preformed layers, a material used for such a purpose should have an index of refraction similar to that of one of the layers undergoing bonding to prevent unwanted reflection.

The polarizing effect of polarizer 24 on the beam of light directed through point 22 may now be described by considering the ordinary and extraordinary rays which result when the diverging beam 60 enters birefringent layer 44. The beam 60 is resolved thereby into two components, shown as separate rays, namely, and extraordinary or "E" ray 60a having, for example, the higher index 1.70 and an ordinary or "O" ray 60b having, for example, the lower index 1.55, the rays traveling in a similar direction but at different speeds and with their vibration azimuths relatively orthogonally disposed. Upon entering layer 44, both the "E" and "O" rays 60a and 60b are refracted slightly toward the normal to the entrance surface of the layer, as shown in FIG. 2. The higher index rays 60a are convergently refracted at the interface 53, it being recalled that the refractive index of isotropic layer 46 was given as 1.55. The rays 60b are undeviated at the interface 64 because their refractive index substantially matches that of layer 46. Ray components 60a and 60b pass through isotropic layer 46 without deviation but component 60b is refracted at the interface 55 due to the relation of their assumed vibration directions to the optic axis 51 of layer 48. The orthogonally polarized ray components are focused at a focal plane adjacent to the exit surface face of the composite structure. As described the layers 44 and 48 are positively birefringent inasmuch as the refractive index of the "E" ray is represented as higher than that of the "O" ray but a reverse condition is possible.

Either the "E" or the "O" ray, or both, may be selectively treated, as by passing them through the retardation strips 54 to provide their vibrations in a single azimuth as shown in FIG. 2. The strips 54 are so relatively spaced that ray components deviated at but one of the interfaces 53 and 55 pass therethrough, it being apparent that rays focused by either lenticulated interface may be chosen for interception by the retardation strips and rotation of their polarizing direction for the purpose of polarizing conformation. Alternatively, the retardation strips 54 may be supplanted by quarter-wave retardation strips positioned similarly to the strips 54 and, additionally, in the space therebetween so as to intercept all of the emergent rays.

Wherein it is required to provide collimated rays from the projection assembly, a collimating means, such as the aforementioned element 30, as shown in FIGURE 1, may be provided over the opening of the projection assembly, said filter having a lenticulated surface thereon to bend the emerging rays into parallel relationship. Alternately, the collimating means may comprise an additional layer on the exit side of polarizer 24, having a lenticulated surface thereon to similarly bend the emerging rays into parallel relationship.

Figure 3:
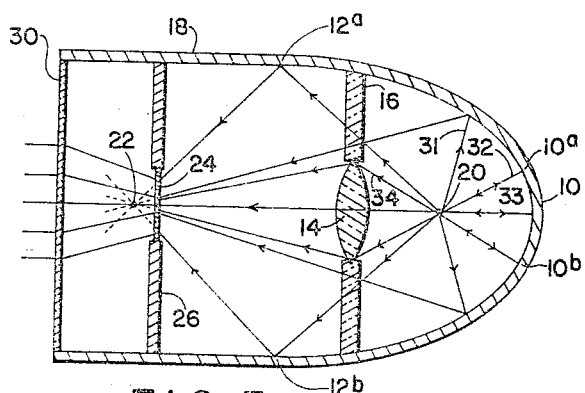
FIG. 3 is a diagrammatic representation of a modified light projecting assembly of the invention.

FIG. 3 illustrates a modification of the light projection assembly of FIGURE 1. The polarizing means 24 has been positioned to intercept the light rays focused toward point 22 before the rays actually pass through that point. The assembly may be slightly shorter due to this arrangement, as shown, but all other structure remains the same and the description of FIGURE 1 applies to those elements with the same reference numerals.

Figure 4:
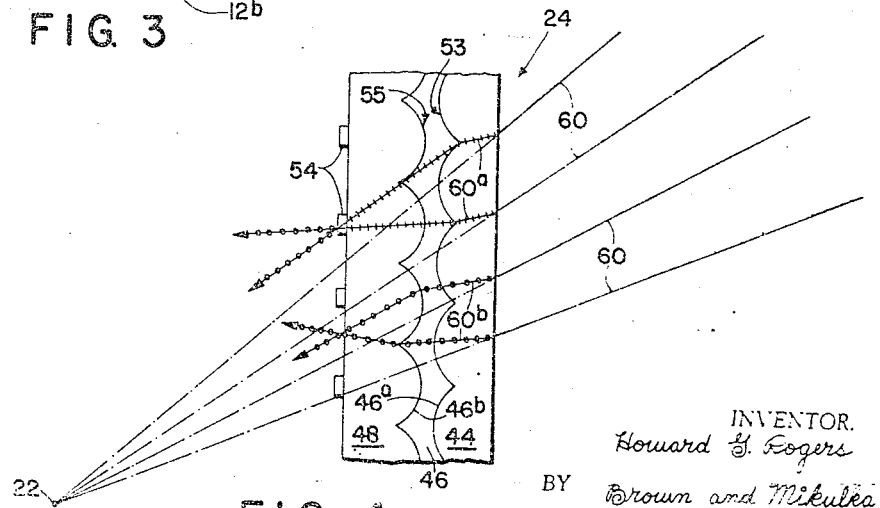
FIG. 4 is a diagrammatic edge view of the light polarizing means of the present invention illustrating the transmission of light rays therethrough as received from said modified light projecting assembly of FIG. 3.

FIGURE 4 is a schematic diagram of the light rays 60 focused at point 22 but intercepted by polarizer 24; the components 60a and 60b being directed by the various layers 44, 46 and 48, strips 54 and interfaces 53 and 55 in exactly the same manner as described in relation to FIG. 2.

It should be realized that the various specifications of the total polarizer 24 such as size, radius of curvature and focal length of lenticules, width of the various layers and spacing of the retardation strips are selected and designed according to the particular type, shape and size of the light source and reflector as well as the relative positioning of the various elements of the light projection assembly with respect to one another.

Although the preferred embodiment of the present invention is directed toward an ellipsoidal reflector means with substantially closely spaced proximate and remote focuses, the invention in its broad concept also contemplates such reflector shapes as parabolic wherein the light source may be located at the proximate focus and the light rays are reflected toward the remote focus at infinity.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Apparatus for projecting polarized light comprising, in combination:
   concave light reflecting means having a proximate focus and a remote focus on an optic axis;
   means for supporting a light source at said proximate focus to provide a reflected light source image at said remote focus;
   lens means located between said proximate focus and said remote focus and acting to project a direct light source image toward said remote focus; and
   a light transmitting total polarizer positioned adjacent said remote focus to intercept both the light rays forming said reflected light source image and the light rays forming said direct light source image and to polarize said light.

2. The apparatus of claim 1 wherein the polarizer means is located forward of said remote focus.

3. The apparatus of claim 1 wherein the polarizer means is located between said proximate focus and said remote focus.

4. The apparatus of claim 1 wherein said concave reflecting means comprises an elliptical reflector.

5. The apparatus of claim 4 including a spherical reflector at the end of said elliptical reflector and opposite said lens means.

6. The apparatus of claim 1 including lens means cooperating with said polarizing means for collimating at least a portion of said polarized light.

7. The apparatus of claim 1 wherein said reflected and direct light source images coincide on said optic axis.

8. The apparatus of claim 1 wherein said light transmitting polarizing means comprises a multilayered device having an interface between a first and second layer thereof which is substantially nonrefractive of a first portion of said light rays forming said reflected and direct light source images and having a given vibration azimuth but refractive to a second portion of said light rays forming said first and second light source images and having a vibration azimuth orthogonal to that of said first portion, said second layer comprising an isotropic layer and said first layer comprising a birefringent layer having one index of refraction differing substantially from the index of refraction of said second layer, said interface having a configuration to refract said first portion of light rays into a plurality of spaced apart components converging toward substantial focus.

9. The apparatus of claim 1 wherein said light transmitting polarizing means comprises a multilayered device having a plurality of interfaces between the layers thereof for receiving unpolarized light and transmitting a large portion of said light in the form of polarized light rays comprising:
   layer means including a first one of said interfaces which first interface is substantially nonrefractive of a first portion of said light rays forming said reflected and direct light source images and having a given vibration azimuth but refractive of a second portion thereof having a vibration azimuth orthogonally disposed relative to that of said first portion, said first interface being bounded on one side by a birefringent layer having one index of refraction substantially equal to an index of refraction of a layer at the opposite side thereof and a second index of refraction differing therefrom, said first interface having a configuration to refract said second portion of light rays into a plurality of spaced apart components converging toward areas of substantial focus; and
   layer means providing a second one of said interfaces which second interface is substantially nonreflective of said second portion of light rays but refractive of said first portion thereof, said second interface being bounded on at least one side by a birefringent layer having one index of refraction substantially equal to an index of refraction of a layer at the opposite side thereof and a second index of refraction differing therefrom, said second interface having a configuration to refract the aforesaid first portion of light rays into a plurality of spaced apart components converging toward substantial focus at areas which are laterally interpositioned between said areas of focus of said second portion of light rays.

10. The apparatus of claim 9 including retardation means adjacent to a surface of said multilayered light polarizing device for selectively altering the polarization azimuth of at least a portion of the light polarized by said apparatus to provide emergent light from said apparatus which has a single given polarization azimuth.

11. The apparatus of claim 9 wherein said retardation means comprise a plurality of elongated laterally spaced half-wave retardation strips.

12. Apparatus for projecting polarized light comprising, in combination:
   concave light reflecting means having a proximate focus and a remote focus on an optic axis;
   means for supporting a light source at said proximate focus to provide a reflected light source image at said remote focus;

lens means located between said proximate focus and said remote focus and acting to project a direct light source image toward said remote focus; and a light transmitting total polarizer positioned adjacent said remote focus to intercept both the light rays forming said reflected light source image and the light rays forming said direct light source image and to polarize said light, said total polarizer comprising lenticules which focus components of said polarized light toward convergence.

References Cited

UNITED STATES PATENTS

| 1,864,696 | 6/1932 | Steele et al. | |
|---|---|---|---|
| 2,273,447 | 2/1942 | Ohl | 240—41.3 |
| 3,395,272 | 7/1968 | Nicholl | 240—41.3 |

NORTON ANSHER, Primary Examiner

WAYNE A. SIVERTSON, Assistant Examiner

U.S. Cl. X.R.

240—41.3; 350—85